United States Patent
Keenan

(10) Patent No.: US 6,691,451 B1
(45) Date of Patent: Feb. 17, 2004

(54) TACKLE BOX CLEANING SYSTEM

(76) Inventor: Marcus Keenan, 12415 32nd St., Santa Fe, TX (US) 77510

( * ) Notice: Subject to any disclaimer, the term of this patent is extended or adjusted under 35 U.S.C. 154(b) by 0 days.

(21) Appl. No.: 10/345,985

(22) Filed: Jan. 17, 2003

(51) Int. Cl.[7] ............................ A01K 97/06; B08B 3/02
(52) U.S. Cl. ...................... 43/54.1; 43/55; 134/166 R; 134/200; 134/186
(58) Field of Search ................ 43/54.1, 55; 134/166 R, 134/200, 186

(56) References Cited

U.S. PATENT DOCUMENTS

| | | | | |
|---|---|---|---|---|
| 1,576,688 A | * | 3/1926 | Thompson | 43/55 |
| 3,648,400 A | * | 3/1972 | Wolfe | 43/54.1 |
| 3,682,184 A | * | 8/1972 | Jackson | 134/63 |
| 3,759,276 A | * | 9/1973 | Nolte | 134/57 DL |
| 4,085,987 A | | 4/1978 | Vartdal | |
| 4,541,539 A | | 9/1985 | Matthews | |
| 4,756,412 A | | 7/1988 | Graves et al. | |
| 4,827,658 A | * | 5/1989 | Wolniak | 43/54.1 |
| 4,841,661 A | * | 6/1989 | Moore | 43/54.1 |
| 5,704,158 A | * | 1/1998 | Whiteaker | 43/57.1 |
| 5,771,841 A | * | 6/1998 | Boor | 119/452 |

\* cited by examiner

*Primary Examiner*—Peter M. Poon
*Assistant Examiner*—Bret Hayes
(74) *Attorney, Agent, or Firm*—Richard C. Litman

(57) ABSTRACT

A tackle box cleaning system for easily removing salt and other debris from lures and tackle stored within the box. The tackle box cleaning system is comprised of a tackle box having a plurality of sides, a front wall, a rear wall and at least one drawer having a perforated bottom wall. A water intake mounted on the rear wall of the box is connected a distribution line connected to at least one nozzle positioned within the box, whereby a source of water, connected to the intake, exits the nozzle in a mist, thereby rinsing the lures and tackle contained within. The inside bottom of the tackle box is angled slightly downward from the rear wall to the front wall, thereby allowing the water flowing through the tackle box to exit through a plurality of drain holes disposed on the sides.

10 Claims, 4 Drawing Sheets

TACKLE BOX CLEANING SYSTEM

BACKGROUND OF THE INVENTION

1. Field of the Invention

The present invention relates to a fisherman's tackle box, and more particularly to a tackle box cleaning system in which lures and tackle contaminated with salt and other minerals may be easily rinsed.

2. Description of the Related Art

Tackle boxes with arrangements allowing the interior of the box to be readily cleaned are well known in the prior art. U.S. Pat. No. 4,085,987 issued to Vartdal, discloses a tackle box having a plurality of shelves with a perforated lower wall, the perforated walls permitting a spray of water applied to the interior of the box to drain quickly through an opening in the bottom wall of the box. U.S. Pat. No. 4,541,539 issued to Mathews, discloses a composite fisherman support system including a tackle box with a closeable drains for each of the storage compartments to prevent the accumulation of water within the box. U.S. Pat. No. 4,756,412 issued to Graves et al. operates similarly and discloses a rinseable tackle box with carousel styled shelves, an angled floor, and drain openings.

While addressing the needs of fishermen to rinse their lures and tackle with fresh water either to prevent damage due to the corrosive effect of salt or for general cleaning purposes, the hosing down of the interior of the tackle box has the disadvantage of wetting areas not intended to be rinsed and inadvertent removal of box components due to the direct impact of the stream of water. None of the above inventions and patents, taken either singularly or in combination, is seen to describe the instant invention as claimed. Thus a tackle box cleaning system solving the aforementioned problems is desired.

SUMMARY OF THE INVENTION

The present invention relates to a fishing tackle box cleaning system for easily removing salt and other debris from the lures and tackles within the box. The tackle box cleaning system is comprised of a tackle box having a plurality of sides, a front wall, a rear wall and at least one drawer slidably mounted in the box, each drawer having a perforated bottom wall. A water intake mounted in the rear wall of the box is connected a distribution line connected to at least one nozzle positioned within the box, whereby a source of water, connected to the intake, exits the nozzle in a mist, rinsing the lures and tackle contained within. The inside bottom of the tackle box is angled slightly downward from the rear to the front and a plurality of drain holes are provided in the side of the box to allow the water flowing through the tackle box to exit.

Accordingly, it is a principal object of the invention to provide a tackle cleaning system whose interior may be cleaned by a mist of water.

It is another object of the invention to provide a tackle cleaning system which rinses certain compartments within the tackle box and allows other compartments of the tackle box to remain dry.

It is a further object of the invention to provide a rinsing mechanism which provided a controlled mist of water so as not to flood the tackle box.

Still another object of the invention is to provide a tackle cleaning system which may be left unattended while the tackle box is being rinsed.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENT

Figure 1:
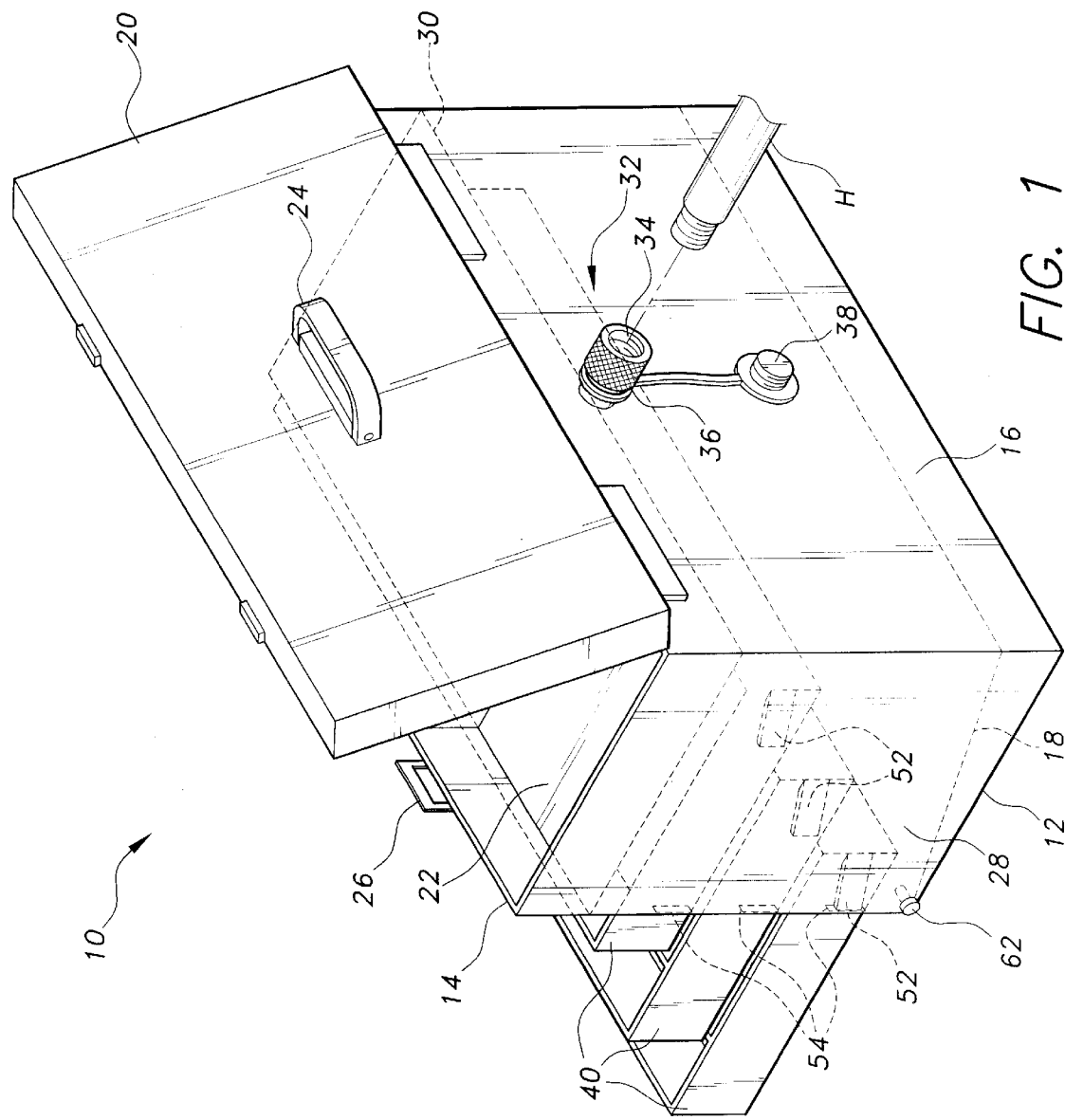
FIG. 1 is an environmental, rear perspective view of a tackle box cleaning system according to the present invention, wherein the lid assembly is shown in its open position.
Figure 2:
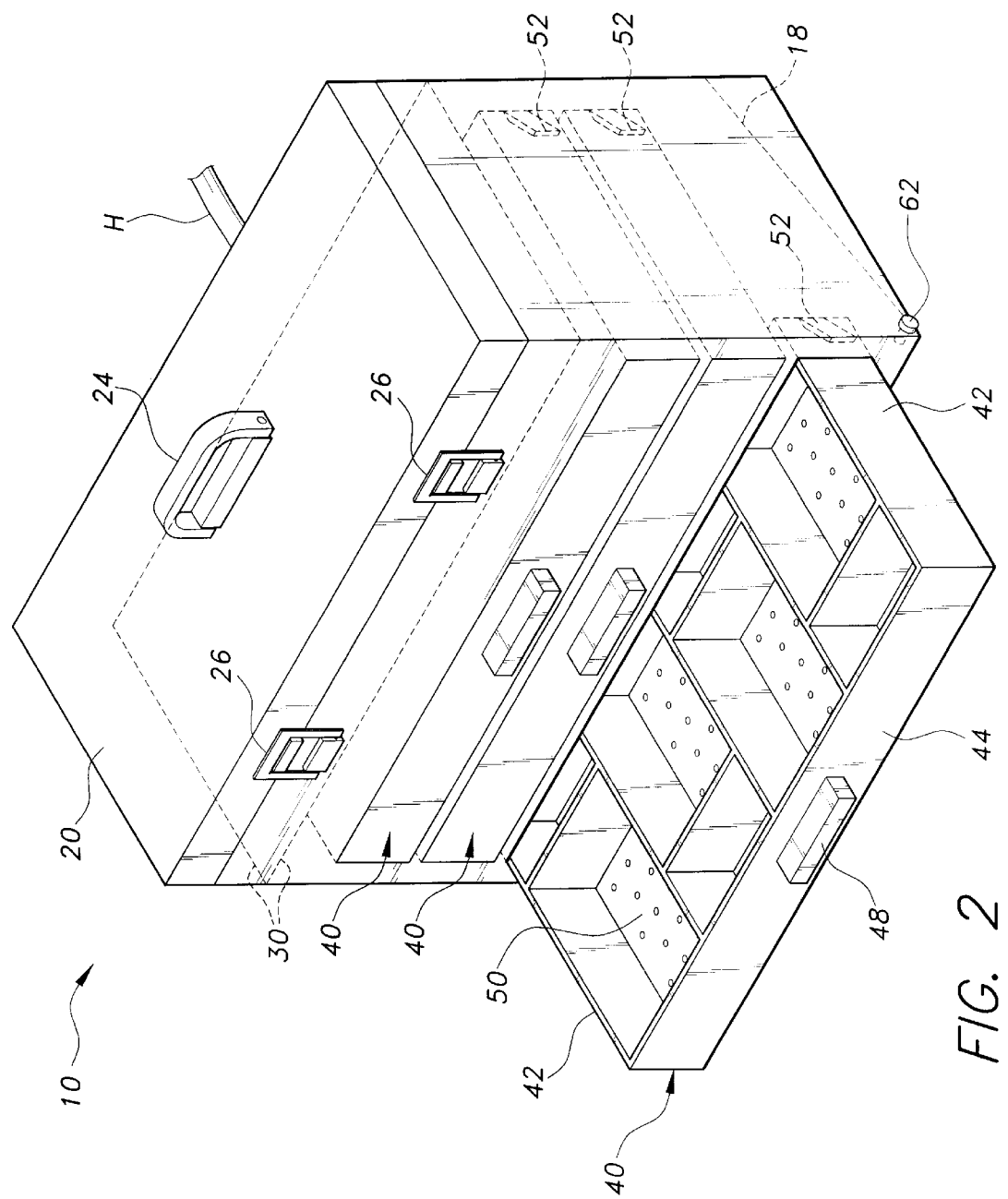
FIG. 2 is front perspective view according to the present invention wherein the lid assembly is shown in its closed position.

As shown in FIGS. 1 and 2, the present invention is a generally rectangular fishing tackle box cleaning system 10 having opposing end walls 12, a front wall 14, a rear wall 16 and a bottom wall 18. A top cover 20 removable in its entirety, provides access to a dry upper compartment 22, the cover 20 further comprising a handle 24 and at least one latch 26 securing the cover 20 to the upper compartment 22. A solid partition 30 separates the upper compartment 22 from a lower compartment 28.

A water intake 32 disposed on the rear wall 16 of the tackle box 10 has internal threads 34 and a knurled rotating collar 36 adapted to threadedly receive one end of a garden hose H. A threaded plug 38, tethered to the base of the intake 32 with a plastic strap, chain or similar fastening device, plugs the intake 32 when disconnected from the garden hose H.

Figure 4:
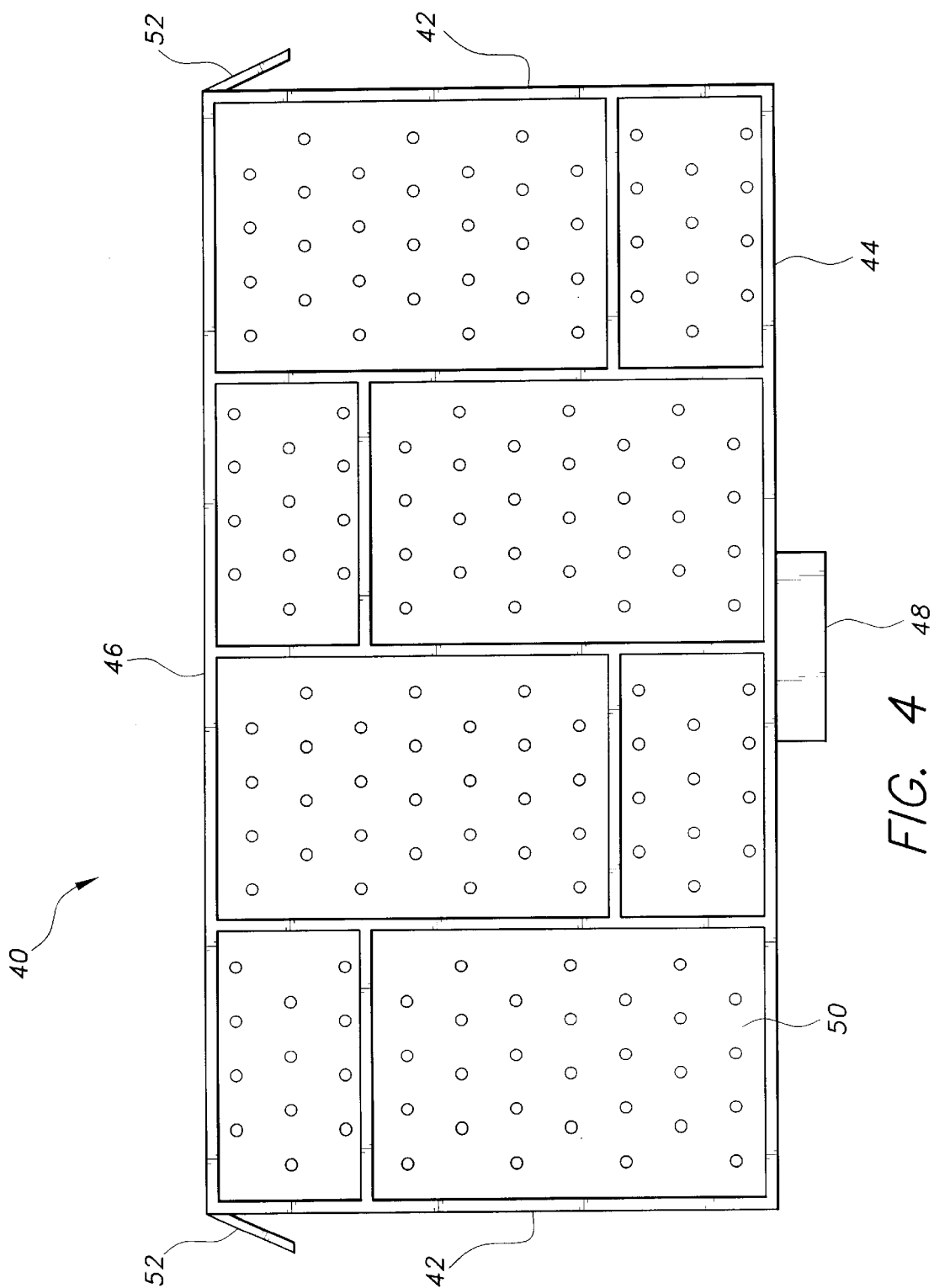
FIG. 4 is a top view of a drawer according to the present invention. Similar reference characters denote corresponding features consistently throughout the attached drawings.

In the present embodiment, three drawers 40 are slidably received by the lower compartment 28. As best shown in FIG. 4, each drawer 40 has substantially parallel end walls 42, a front wall 44, a rear wall 46, a handle 48 and a perforated bottom wall 50. Plastic depressible clips 52, located at the rear of each drawer engage stops 54 on the front wall 14 of the tackle box 10 preventing the drawer 40 from being completely removed from the lower compartment 28 unless the clips 52 are depressed.

Figure 3:
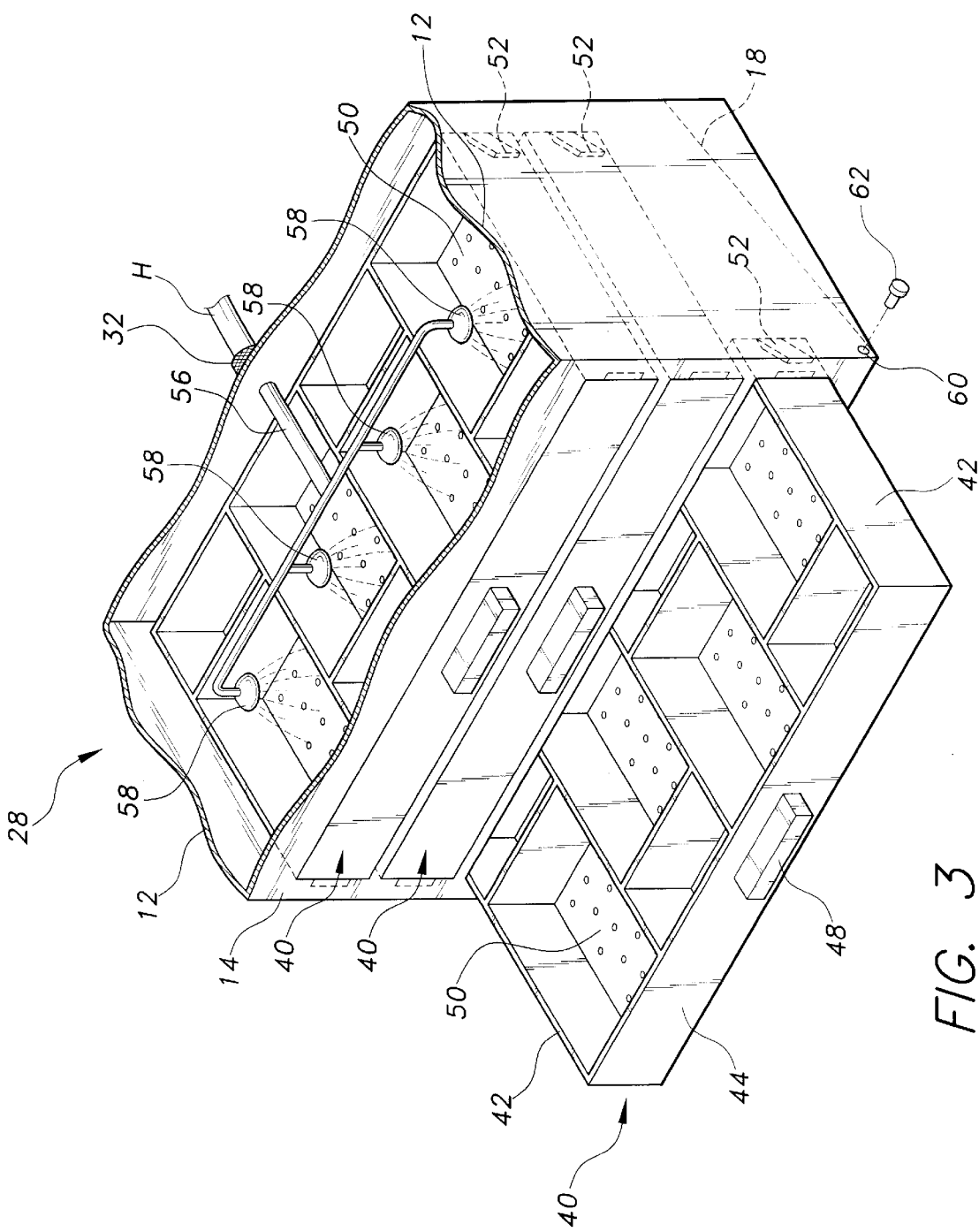
FIG. 3 is a fragmented, front perspective view according to the present invention wherein the nozzles and water distribution system are shown in their operating condition.

As shown in FIG. 3, the intake 32 is connected to a distribution line 56 connected to each of four plastic nozzles 58 positioned at the top of the lower compartment 28, whereby a flow of water entering the intake 32 exits the nozzles 58 in a mist, thereby rinsing the contents of the underlying drawers 40, the perforated bottom wall 50 of each drawer 40 permitting water to drain to the inside bottom wall 18 of the tackle box 10. The inside bottom wall 18 slopes downward from the rear wall 16 to the front wall 14, whereby water received on the bottom wall 18 flows towards the front wall 14 and out drain openings 60 disposed on the opposing end walls 12. Drain plugs 62 are inserted into the drain openings 60 when the tackle box 10 is not being cleaned.

The tackle box cleaning system operates to easily clean items in the lower compartment 28 by closing all the drawers

40, attaching a garden hose H to the intake 32, removing the drain plugs 62 and turning on the source of water, whereby the contents of lower compartment 28 are rinsed while the contents of the upper compartment 22 remain dry.

Although the present invention as disclosed has three drawers and four nozzles, tackle box cleaning systems with more or less drawers or nozzles are possible. It is to be understood that the present invention is not limited to the embodiment described above, but encompasses any and all embodiments within the scope of the following claims.

I claim:

1. A fishing tackle box for rinsing impurities off of small articles comprising:
   (a) a plurality of sides, a front wall, a rear wall, a bottom wall, the bottom wall extending downwardly from the rear wall towards the front wall;
   (b) at least one drawer slidably mounted in the front wall and at least partially slidable from the front wall for access thereinto, the at least one drawer having upstanding peripheral walls and a perforated bottom wall;
   (c) an intake and at least one drainage opening, the intake connected to a distribution line, the line connected to at least one nozzle positioned above the at least one drawer, wherein a source of liquid connected to the intake exits the nozzle in a mist, rinsing the articles beneath the at least one nozzle and draining from the apparatus through the at least one drainage opening;
   (d) a removable closure for the intake, the intake closure attached to a portion of the apparatus with a fastening means at a position proximate to the intake;
   (e) a removable closure for the at least one drainage opening.

2. A fishing tackle box cleaning system comprising:
   (a) a plurality of sides, a cover, a rear wall, a front wall, a bottom wall, the bottom wall extending downwardly from the rear wall towards the front wall;
   (b) at least one drawer slidably mounted in the front wall and at least partially slidable from the front wall for access thereinto, the at least one drawer having upstanding peripheral walls and a perforated bottom wall for draining liquid from the at least one drawer;
   (c) an intake and at least one drainage opening, the intake connected to a distribution line, the line connected to at least one nozzle positioned above the at least one drawer, wherein a source of water, connected to the intake, exits the nozzle in a mist, rinsing contents beneath the at least one nozzle and draining from the tackle box through the at least one drainage opening.

3. The tackle box cleaning system according to claim 2, having a removable closure for the intake, the intake closure tethered to a portion of the tackle box with a fastening means.

4. The tackle box cleaning system according to claim 2, wherein the intake has a rotating knurled collar and internal threads to threadedly receive the source of water.

5. The tackle box cleaning system according to claim 2, having a removable closure for the at least one drainage opening.

6. A fishing tackle box cleaning system comprising:
   (a) an upper compartment, a lower compartment, a solid partition separating the upper compartment from the lower section, opposing end walls, a front wall, a rear wall and a bottom wall, the bottom wall extending downwardly from the rear wall towards the front wall;
   (b) a latchable lid covering the upper compartment;
   (c) at least one drawer slidably mounted in the lower compartment and at least partially slidable from the lower compartment for access thereinto, each of the at least one drawer having upstanding peripheral walls and a perforated bottom wall;
   (d) an intake and at least one drainage opening, the intake connected to a distribution line, the line connected to at least one nozzle positioned at a top of the lower compartment, wherein a source of water, connected to the intake, exits the nozzle in a mist, thereby rinsing contents of the lower compartment and draining from the tackle box through the at least one drainage opening.

7. The tackle box cleaning system according to claim 6, having a removable closure for the intake, the intake closure tethered to a portion of the tackle box with a fastening means.

8. The tackle box cleaning system according to claim 6, having a removable closure for the at least one drainage opening.

9. The tackle box cleaning system according to claim 6, wherein the intake has a rotating knurled collar and internal threads to threadedly receive the source of water.

10. The fishing tackle box of claim 6, wherein the at least one drawer has a pair of depressible clips which operate to allow selective removal of the drawer from the tackle box.

* * * * *